US012312858B2

(12) United States Patent
Barbulescu et al.

(10) Patent No.: US 12,312,858 B2
(45) Date of Patent: May 27, 2025

(54) WATER EVACUATION SYSTEM FOR FAÇADE SYSTEMS

(71) Applicant: ARCONIC TECHNOLOGIES LLC, Pittsburgh, PA (US)

(72) Inventors: Ion-Horatiu Barbulescu, Marietta, GA (US); Emmanuel Delgado, Lawrenceville, GA (US); Ahmed Hassan Faeq, Snellville, GA (US); Thuan Nguyen, Lake City, GA (US); David Salazar, Rockmart, GA (US); Huong Ngoc Tran, Jonesboro, GA (US); Thanh Nhan Tran, Douglasville, GA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 18/300,611

(22) Filed: Apr. 14, 2023

(65) Prior Publication Data

US 2023/0340832 A1 Oct. 26, 2023

Related U.S. Application Data

(60) Provisional application No. 63/335,104, filed on Apr. 26, 2022.

(51) Int. Cl.

| | |
|---|---|
| ***E06B 1/70*** | (2006.01) |
| ***E06B 3/46*** | (2006.01) |
| ***E06B 7/14*** | (2006.01) |
| ***E06B 7/26*** | (2006.01) |

(52) U.S. Cl.
CPC .............. *E06B 1/70* (2013.01); *E06B 3/4636* (2013.01); *E06B 7/14* (2013.01); *E06B 7/26* (2013.01)

(58) Field of Classification Search
CPC .......................................................... E06B 1/70
See application file for complete search history.

(56) References Cited

U.S. PATENT DOCUMENTS

| | | | | |
|---|---|---|---|---|
| 1,419,352 A * | 6/1922 | Boe | H01H 35/18 | 200/84 R |
| 6,612,780 B2 * | 9/2003 | Dahowski | E03F 3/046 | 210/170.1 |
| 9,366,070 B2 * | 6/2016 | Baczuk | E06B 1/70 | |

(Continued)

FOREIGN PATENT DOCUMENTS

| | | | |
|---|---|---|---|
| EP | 3508680 A1 * | 7/2019 | E05D 15/12 |

*Primary Examiner* — Marcus Menezes
(74) *Attorney, Agent, or Firm* — Vorys, Sater, Seymour and Pease LLP

(57) ABSTRACT

A water evacuation system includes a sill providing a dam that defines one or more drain ports, an accumulation chamber defined within the interior of the sill and in fluid communication with the dam via the one or more drain ports, and one or more discharge ports defined in a front face of the sill and in fluid communication with the accumulation chamber. An internal ramp is arranged within the accumulation chamber and includes an angled upper surface directed toward the one or more discharge ports to urge water to the discharge ports. Alternatively, or in addition thereto, a pump is in fluid communication with the sill and a float switch is secured to the sill to send a signal to operate the pump when water accumulating in the sill reaches a predetermined level for evacuation.

21 Claims, 5 Drawing Sheets

(56) References Cited

U.S. PATENT DOCUMENTS

| | | | | |
|---|---|---|---|---|
| 2008/0222961 A1* | 9/2008 | Meeks | ...................... | E06B 1/70<br>49/467 |
| 2021/0238917 A1* | 8/2021 | Anderson | ................. | E06B 1/36 |

* cited by examiner

WATER EVACUATION SYSTEM FOR FAÇADE SYSTEMS

BACKGROUND

Many types of doorways, such as sliding doors, include sill structures or "sills". The sill is located at the bottom of the exterior framework of the door and operates as a type of gateway that helps prevent water and air from entering a building.

Under normal weather conditions, where there is generally no wind or elevated atmospheric pressure, water that manages to migrate into a doorway sill is able to flow out through dedicated flow passageways and weep holes provided in the sill. However, in heavy weather and storm conditions, sustained winds can prevent water from naturally weeping from the sill as designed. In such scenarios, water within the sill can progressively accumulate and potentially overflow the dam created by the sill, which may result in water leaking into the inside of the building.

What is needed is a sill assembly that is able to evacuate water effectively, that is easy to manufacture, assemble, maintain, and replace, and that is reliable.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

Embodiments disclosed herein include a water evacuation system that includes a sill providing a dam that defines one or more drain ports, an accumulation chamber defined within the interior of the sill and in fluid communication with the dam via the one or more drain ports, and one or more discharge ports defined in a front face of the sill and in fluid communication with the accumulation chamber. The water evacuation system further includes an internal ramp arranged within the accumulation chamber below the one or more drain ports and including an angled upper surface directed toward the one or more discharge ports, wherein water entering the accumulation chamber via the one or more drain ports will impinge upon the angled upper surface and flow towards the one or more discharge ports to be evacuated from the sill. In a further embodiment, the internal ramp comprises an elongate body having opposing first and second ends, and a bottom arranged opposite the angled upper surface, each of the bottom and the angled upper surface extending between the first and second ends, wherein the angled upper surface extends at an angle relative to the bottom from an upper edge to a lower edge, and the lower edge is arranged closer to the one or more discharge ports when the internal ramp is arranged within the accumulation chamber. In a further embodiment, the angle ranges between about 1° and about 15°. In a further embodiment, the elongate body further includes opposing end walls provided at each end. In a further embodiment, the water evacuation system further includes a pump in fluid communication with the sill via an inlet conduit to draw water from the sill into the inlet conduit, a discharge conduit extending from the pump to an outlet orifice to convey the water from the pump to the outlet orifice to be discharged to an exterior of a building, and a float switch mounted to the sill and in communication with the pump, wherein, when the water accumulating in the sill reaches a predetermined level and acts on the float switch, the float switch sends a signal to the pump to commence pumping the water out of the sill. In a further embodiment, the float switch is arranged within one of the dam and the accumulation chamber, and the inlet conduit extends between the pump and the one of the dam and the accumulation chamber. In a further embodiment, the water evacuation system further includes a discharge port cover secured to the sill at a corresponding one of the one or more discharge ports, the discharge port cover including a body that includes a front plate, a top extending laterally from and perpendicular to the front plate, and one or more coupling members receivable within the corresponding one of the one or more discharge ports to secure the discharge port cover to the corresponding one of the one or more discharge ports, wherein, when the discharge port cover is received within the corresponding one of the one or more discharge ports, a downspout is cooperatively defined between the discharge port cover and the front face of the sill. In a further embodiment, the water evacuation system further includes a movable shield actuatable between a stowed configuration and a deployed configuration, wherein, when the movable shield is transitioned to the deployed configuration, the movable shield diverts water away from the dam. In a further embodiment, the sill provides a mounting portion and a sliding door assembly is configured to be mounted to the sill at the mounting portion, the a sliding door assembly including a sill receptor that defines a cavity sized to receive the mounting portion, and one or more panels mounted to the sill receptor and extending vertically therefrom.

Embodiments disclosed herein may further include a water evacuation system that includes a sill providing a dam that defines one or more drain ports, an accumulation chamber defined within the interior of the sill and in fluid communication with the dam via the one or more drain ports, and one or more discharge ports defined in a front face of the sill and in fluid communication with the accumulation chamber. The water evacuation system further includes a pump in fluid communication with the sill via an inlet conduit, and a discharge conduit extending from the pump to an outlet orifice to convey water from the pump to the outlet orifice to be discharged to an exterior of a building. In another embodiment, the water evacuation system further includes a float switch mounted to the sill and communicably coupled to the pump, the float switch including a static portion secured to the sill, and a floating portion pivotably coupled to the static portion and buoyant in water, wherein, when water accumulating in the sill reaches a predetermined level, the floating portion floats on the water and sends a signal to the pump to commence operation. In a further embodiment, the float switch is arranged within one of the dam and the accumulation chamber. In a further embodiment, the inlet conduit extends between the pump and the one of the dam and the accumulation chamber. In a further embodiment, one or both of the inlet and discharge conduits extend at least partially through a frame member extending vertically from the sill. In a further embodiment, the water evacuation system further includes an internal ramp arranged within the accumulation chamber below the one or more drain ports and including an angled upper surface directed toward the one or more discharge ports, wherein, water entering the accumulation chamber via the one or more drain ports will impinge upon the angled upper surface and flow towards the one or more discharge ports to be evacuated from the sill. In a further embodiment, the internal ramp comprises an elongate body having opposing first and second ends, and a bottom arranged opposite the angled upper surface, each of the bottom and the angled upper surface extending between the first and second ends, wherein the angled upper surface extends at an angle relative to the bottom from an upper edge to a lower edge, and the lower edge is arranged closer to the one or more discharge ports. In a further embodiment, the water evacuation system further includes a discharge port cover secured to the sill at a corresponding one of the one or more discharge ports, the discharge port cover including a body that includes a front plate, a top extending laterally from and perpendicular to the front plate, and one or more coupling members receivable within the corresponding one of the one or more discharge ports to secure the discharge port cover to the corresponding one of the one or more discharge ports, wherein, when the discharge port cover is received within the corresponding one of the one or more discharge ports, a downspout is cooperatively defined between the discharge port cover and the front face of the sill. In a further embodiment, the water evacuation system further includes a movable shield actuatable between a stowed configuration and a deployed configuration, wherein, when the movable shield is transitioned to the deployed configuration, the movable shield diverts water away from the dam.

Embodiments disclosed herein may further include a method that includes the steps of receiving water into a dam of a sill, draining the water from the dam into an accumulation chamber via one or more drain ports defined in the dam, the accumulation chamber being defined within the interior of the sill below the dam, receiving the water draining into the accumulation chamber on an internal ramp arranged within the accumulation chamber, the internal ramp including an angled upper surface directed toward one or more discharge ports defined in a front face of the sill and in fluid communication with the accumulation chamber, and flowing the water from the internal ramp towards the one or more discharge ports to be evacuated from the sill.

Embodiments disclosed herein may further include a method that includes the steps of receiving water into a dam of a sill, draining at least a portion of the water from the dam into an accumulation chamber via one or more drain ports defined in the dam, the accumulation chamber being defined within the interior of the sill below the dam, and the sill having a float switch mounted thereto and arranged within one of the dam and the accumulation chamber, the float switch including a static portion secured to the sill, and a floating portion pivotably coupled to the static portion and buoyant in the water. The method may further include accumulating the water within the one of the dam and the accumulation chamber and thereby causing the floating portion to float on the water, sending a signal to a pump in communication with the float switch when the water accumulating in the one of the dam and the accumulation chamber reaches a predetermined level, drawing the water out of sill with the pump upon receiving the signal, and pumping the water to an outlet orifice to be discharged to an exterior of a building via a discharge conduit extending from the pump to the outlet orifice.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to doorway construction and, more particularly, to doorway sills that incorporate enhanced water evacuation systems.

The embodiments disclosed herein describe a door water evacuation system designed to maintain pressure equalization, maintain positive outlet velocity, and provide an irreversible flow path. The door water evacuation system may include components that are 2D extrudable or 3D printable, and may be designed as an add-on part to existing door assemblies. The door water evacuation systems described herein may also occupy a small space and be capable of fitting in the original sill structure of an existing door assembly, or other façade-type systems. In one embodiment, the door water evacuation system includes a cap that covers a weep hole defined in the sill of an existing door assembly. In another embodiment, or in addition thereto, an internal ramp is included (e.g., extruded) within the sill and allows water to flow toward discharge ports at a quicker pace. In yet other embodiments, or in addition thereto, a pump and an interconnected float switch are attached to the sill and the pump is automatically activated when water within the sill reaches a predetermined level. The pump operates to draw the water out of the sill so that it does not enter the interior of the building.

Figure 1:
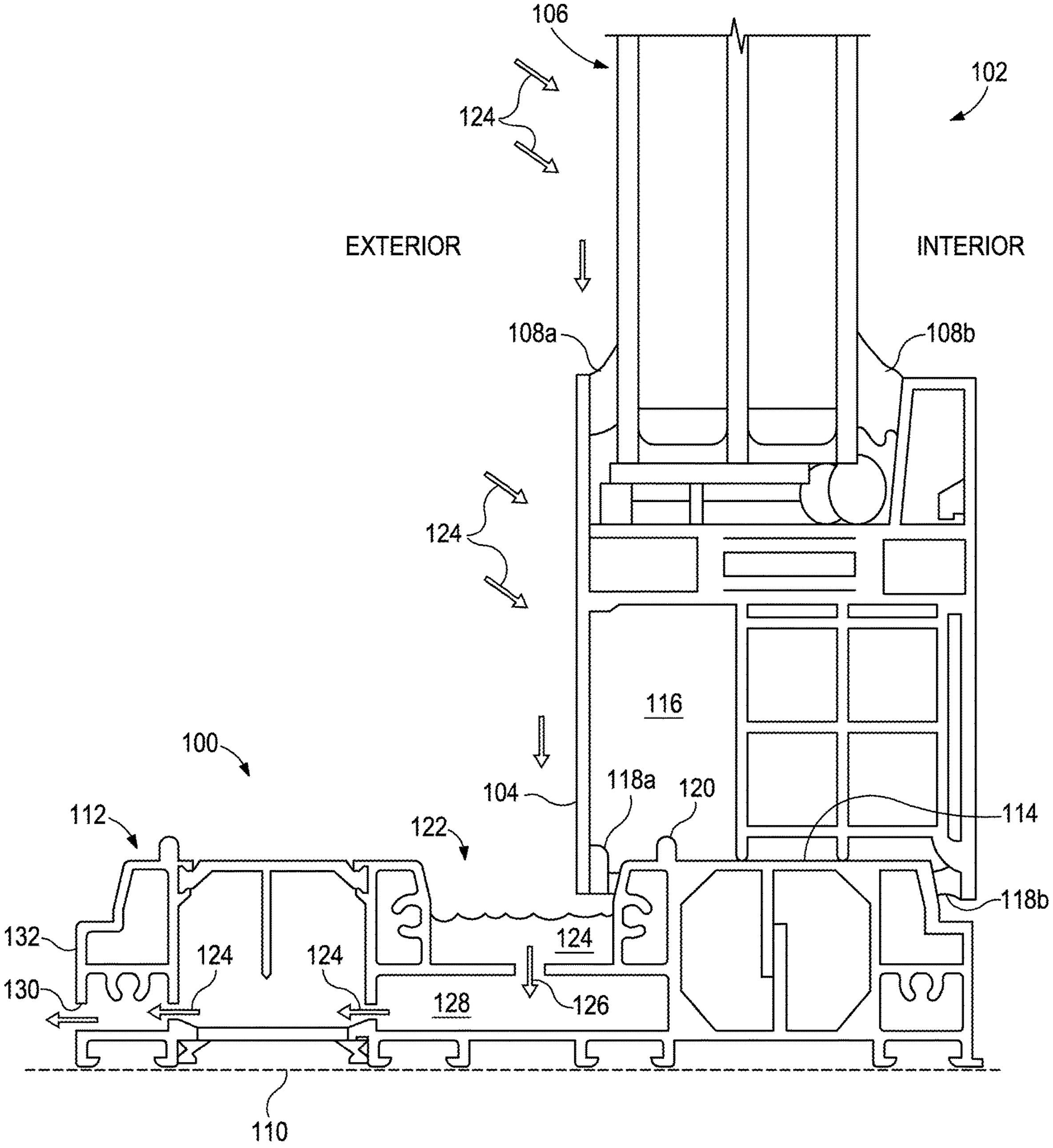
FIG. 1 (Prior Art)
FIG. 1 is a schematic side view of a prior art sill that may incorporate the principles of the present disclosure.

FIG. 1 is a schematic side view of a prior art sill 100 that may incorporate the principles of the present disclosure. In the illustrated example, the sill 100 may be used to support a sliding door assembly 102, and the sliding door assembly 102 includes a sill receptor 104 and a panel 106 mounted to the sill receptor 104 and extending vertically therefrom. The panel 106 may comprise, for example, one or more panes of window glass, polycarbonates, or other clear, translucent, tinted, or opaque panels. In the illustrated example, the panel 106 includes three panes mounted to each other (e.g., back to back), but could alternatively include more or less than three. The panel 106 may be mounted to the sill receptor 104 using one or more gaskets, shown as a first or "exterior" gasket 108*a* and a second or "interior" gasket 108*b*.

The sill 100 may be mounted to or otherwise placed on a lower substrate 110, such as the ground, the floor of a building, or any other planar, underlying surface. The sill 100 may comprise a rigid structure (e.g., an extrusion) made of aluminum, an aluminum alloy, another metal, other metal alloys, a plastic, a composite material, or any combination thereof. As illustrated, the sill 100 includes an exterior portion 112, which constitutes the exposed portion of the sill 100 that is commonly subject to foot traffic, etc.

In some cases, a sliding screen door may be mounted to the sill 100. For example, the sill 100 further includes an interior or "mounting" portion 114 sized to receive and mount the sliding door assembly 102 to the sill 100. More specifically, the interior portion 114 may be configured to be received within a cavity 116 defined in a lower portion of the sill receptor 104. One or more seals, shown as a first or "exterior" seal 118*a* and a second or "interior" seal 118*b* may be configured to seal corresponding interfaces between the sill receptor 104 and the interior portion 114. While not shown, the sliding door assembly 102 may include one or more rolling elements or wheels rollingly engageable with a track 120 provided on the interior portion 114.

The sill 100 may further provide or otherwise define a dam 122 that interposes the exterior portion 112 and the interior portion 114. During operation of the sill 100, the dam 122 may be configured to receive water 124 (e.g., precipitation, melted ice, etc.) originating from the exterior. For example, during a weather event with precipitation, water 124 in the form of precipitation may impact and flow down the exterior surfaces of the sliding door assembly 102 to be received within the dam 122.

The dam 122 helps prevent the water 124 from migrating past the interior portion 114 and into the interior of the building. To help accomplish this, one or more drain ports 126 (one shown) may be defined in the bottom of the dam 122 to allow accumulated water 124 to flow into an accumulation chamber 128 defined within the interior of the sill 100 below the dam 122. The accumulation chamber 128 may define and otherwise provide a flow path within the interior of the sill 100 that places the dam 122 in fluid communication with one or more weep holes or "discharge ports" 130 (one shown) defined in the front face 132 of the sill 100. Accordingly, water 124 draining into the accumulation chamber 128 from the dam 122 via the drain ports 126 may be able to exit the interior of the sill 100 by circulating through the flow path provided by the accumulation chamber 128 until being discharged from the sill 100 via the discharge port(s) 130.

Under normal weather conditions, when there is generally no wind or elevated atmospheric pressure, water 124 received within the dam 122 is readily able to circulate out of the sill 100 by flowing into the accumulation chamber 128 and being discharged via the discharge ports 130. However, in heavy weather and storm conditions, sustained winds impacting the discharge ports 130 can prevent water from naturally weeping from the sill 100 as designed. Moreover, heavy storm conditions that precipitate large volumes of water 124 can potentially overwhelm the capacity (volume) of the dam 122 and/or the flow rate capacity of the water 124 being discharged from the sill 100 at the discharge ports 130. In such scenarios, the water 124 will progressively accumulate and potentially overflow the dam 122 and migrate into the inside of the building.

According to embodiments of the present disclosure, the sill 100 may include or otherwise incorporate a water evacuation system operable to enhance the evacuation and drainage of the water 124 from the sill 100, and thereby help prevent migration of the water 124 into the inside of the building. In some embodiments, as discussed below, the water evacuation system may comprise a static system that naturally urges the water 124 out of the sill 100 via natural forces. In other embodiments, however, the water evacuation system may comprise a dynamic system that includes movable or mechanized components that actively pump or impel the water 124 out of the sill 100. In yet other embodiments, the water evacuation system can include both dynamic and static elements, without departing from the scope of the disclosure.

It should be noted that, while the sill 100 is shown in FIG. 1 in conjunction with and supporting the sliding door assembly 102, it is contemplated herein that the sill 100 could alternatively be used in conjunction with and otherwise support any type of sliding or pivoting façade system or component. Example façade systems that may be used in conjunction with the sill 100 and the water evacuation systems described herein include, but are not limited to, a swinging door, a sliding window, a swinging window, or any combination thereof. Accordingly, the sliding door assembly 102 may alternately be referred to herein as a "façade system".

Figure 2A:
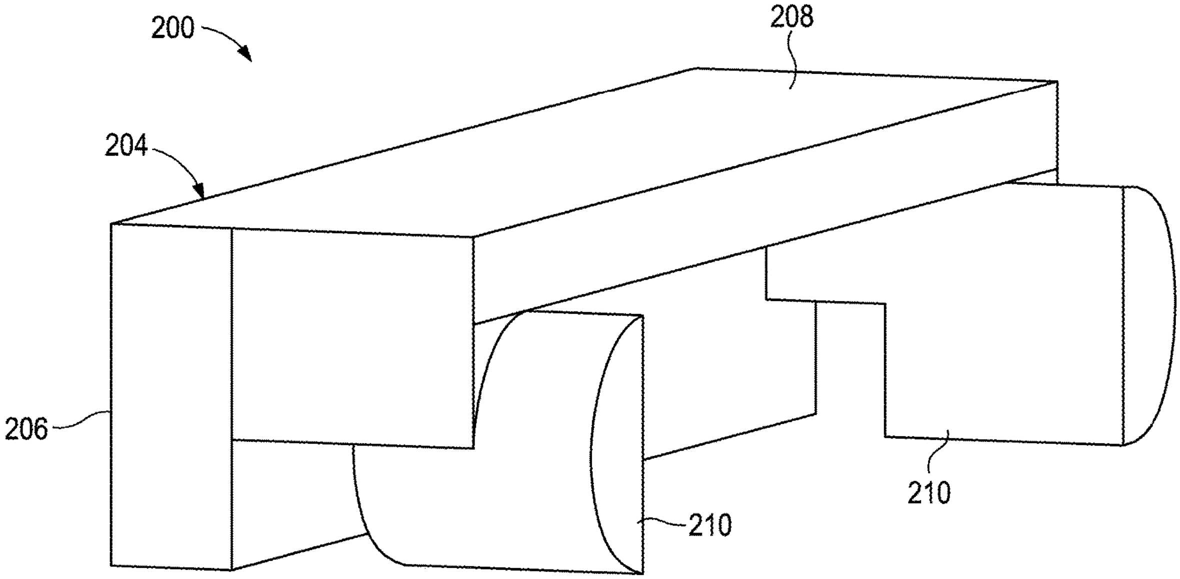
FIG. 2A is an isometric view of an example discharge port cap, according to one or more embodiments of the present disclosure.
Figure 2B:
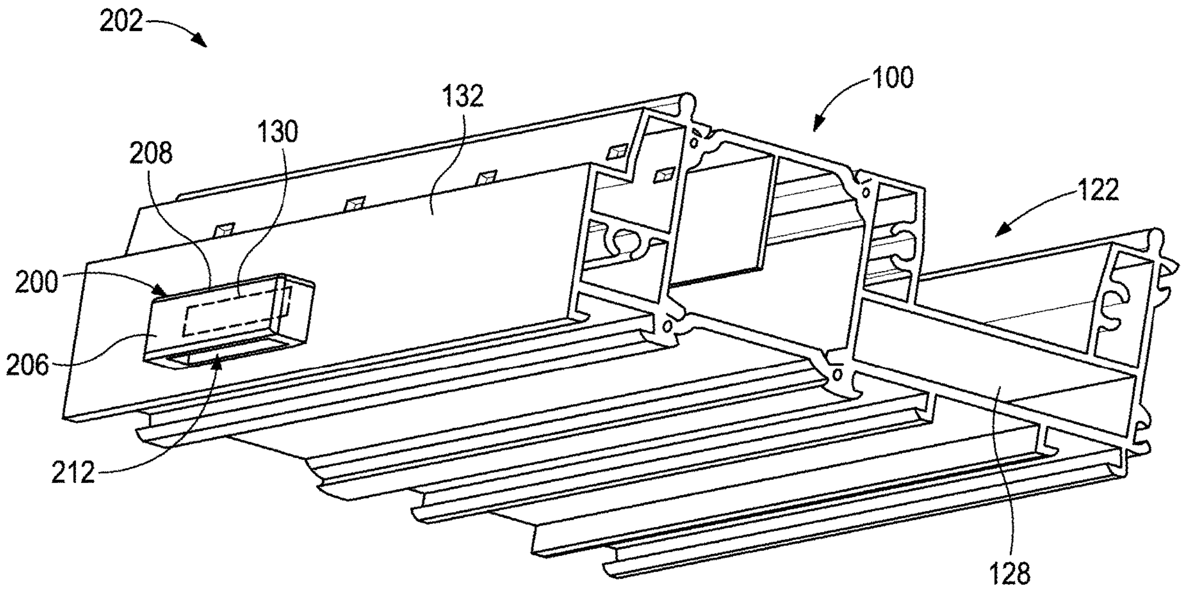
FIG. 2B is an isometric view of an example water evacuation system that incorporates the discharge port cap of FIG. 2A, according to one or more embodiments of the present disclosure.

FIG. 2A is an isometric view of an example discharge port cover 200, and FIG. 2B is an isometric view of an example water evacuation system 202 that incorporates the discharge port cover 200, according to one or more embodiments of the present disclosure. Referring first to FIG. 2B, the water evacuation system 202 includes the sill 100 of FIG. 1, which includes the dam 122, the accumulation chamber 128 defined within the interior of the sill 100, and the discharge port(s) 130 (shown in dashed lines) defined in the front face 132 of the sill 100 and in fluid communication with the accumulation chamber 128. The water evacuation system 202 further includes the discharge port cover 200, which is sized and otherwise configured to be received by or within a corresponding one of the discharge ports 130. In FIG. 2B, the discharge port cover 200 is occluding the corresponding discharge port 130.

Referring now to FIG. 2A, the discharge port cover 200 includes a body 204, which may comprise a monolithic, one-piece part, but could alternatively consist of multiple pieces connected or otherwise coupled together to form the body 204. The body 204 may be made of a variety of rigid materials including, but not limited to, a metal, a metal alloy, a plastic, a hard rubber, a composite material, wood, or any combination thereof. In some embodiments, the body 204 may be 3D printed, but could alternatively be manufactured via other known means of manufacturing, such as injection molding.

As illustrated, the body 204 includes or otherwise defines a front plate 206, and a top 208 that extends laterally and perpendicular to the front plate 206. When the discharge port cover 200 is received within the discharge port 130 (FIG. 2B), the front plate 206 will extend substantially parallel with the front face 132 (FIG. 2B), and the top 208 will extend substantially perpendicular to the front face 132. Unlike conventional discharge port covers, which commonly do not have a top, discharge port cover 200 includes the top 208, which may help maintain pressure equalization and maintain positive outlet velocity at the discharge port 130. In particular, the top 208 may help block wind from entering the discharge port 130, which could otherwise break pressure equalization and prevent the water from draining out the discharge port 130.

The body 204 further includes one or more coupling members 210 extending from the front plate 206 and configured to be received within the discharge port 130 via a snap fit or interference engagement. In some embodiments, as illustrated, the coupling members 210 may also be secured to or otherwise form part of the bottom surface of the top 208. Advancing the coupling members 210 into the discharge port 130 may result in the discharge port cover 200 being removably attached to the sill 100 at the discharge port 130.

Referring again to FIG. 2B, in example operation of the water evacuation system 202, the discharge port cover 200 is installed in the discharge port(s) 130 to prevent wind from entering into the interior of the sill 100, and thereby preventing water from draining from the sill 100 via the discharge port(s) 130. When the discharge port cover 200 is attached to the sill 100 at a corresponding discharge port 130, a downspout 212 is cooperatively defined between the discharge port cover 200 and the front face 132 of the sill 100. The downspout 212 fluidly communicates with the corresponding discharge port 130. Accordingly, water that drains into the accumulation chamber 128 from the dam 120 will be able to weep or flow out of the sill 100 via the discharge port 130 and the corresponding downspout 212. The front plate 206 and the top 208 of the discharge port cover 200 continuously block wind that would otherwise circulate into the discharge port 130 and impede flow of the water out of the sill 100 via the discharge port 130.

Figure 3A:
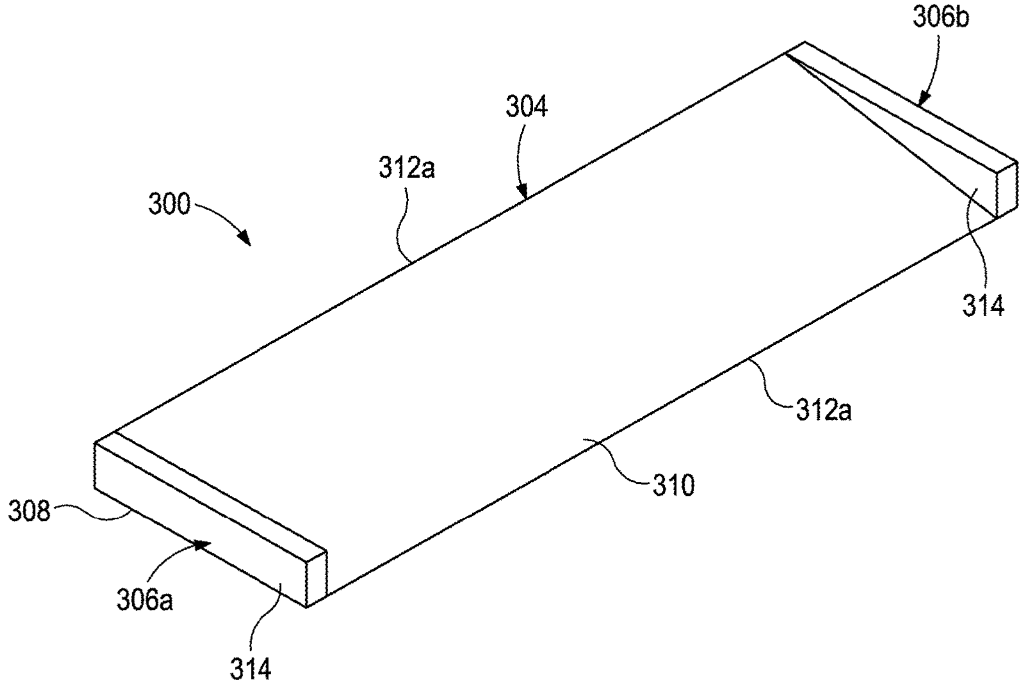
FIG. 3A is an isometric view of an example internal ramp.
Figure 3B:
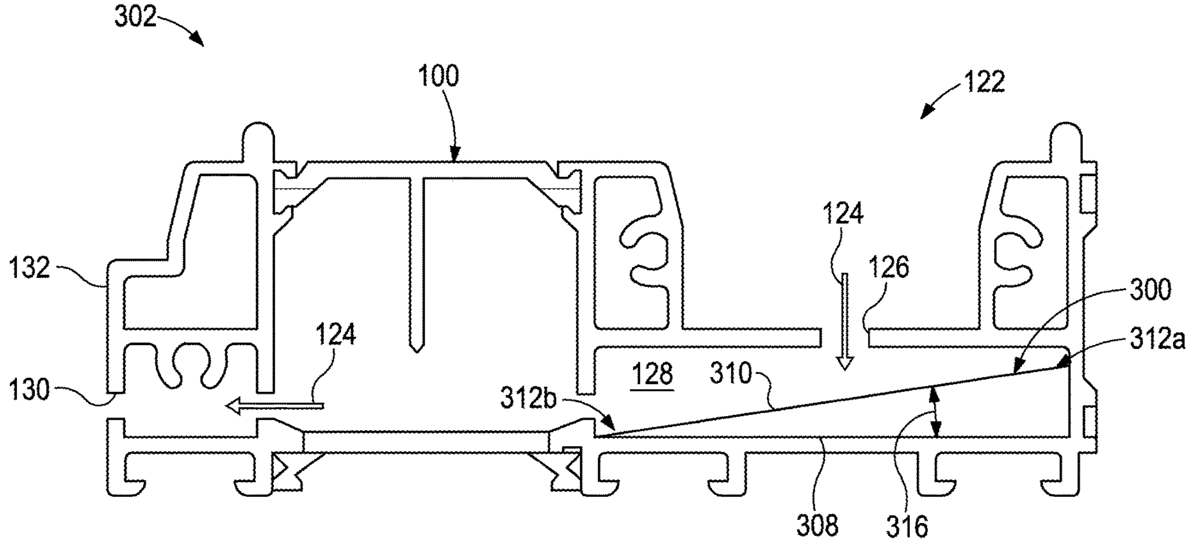
FIG. 3B is an isometric view of another example water evacuation system that incorporates the internal ramp of FIG. 3A, according to one or more embodiments of the present disclosure.

FIG. 3A is an isometric view of an example internal ramp 300, and FIG. 3B is an isometric view of another example water evacuation system 302 that incorporates the internal ramp 300, according to one or more additional embodiments of the present disclosure. Referring first to FIG. 3B, the water evacuation system 302 includes the sill 100, which includes the dam 122, the accumulation chamber 128, and the discharge port(s) 130 (shown in dashed lines) defined in the front face 132 of the sill 100 and in fluid communication with the dam 122 via the drain port(s) 126 and the accumulation chamber 128. The water evacuation system 302 further includes the internal ramp 300 arranged within the accumulation chamber 128.

In some embodiments, the internal ramp 300 may comprise an integral part of the sill 100. In such embodiments, the internal ramp 300 may be formed or otherwise co-extruded simultaneously with the sill 100 and within the accumulation chamber 128. In other embodiments, however, the internal ramp 300 may comprise a separate component part designed to be received within the interior of the sill 100. In such embodiments, the internal ramp 300 may be installed in the sill 100 in a retrofit application or the like.

Referring now to FIG. 3A, the internal ramp 300 is depicted as a separate component part that includes an elongate body 304, which may comprise a monolithic, one-piece part, but could alternatively consist of multiple pieces connected or otherwise coupled together to form the body 304. The body 304 may be made of a variety of rigid materials including, but not limited to, a metal, a metal alloy, a plastic, a hard rubber, a composite material, wood, or any combination thereof. In some embodiments, the body 304 may be 3D printed, but could alternatively be manufactured via other known means of manufacturing, such as injection molding.

As illustrated, the body 304 may comprise a generally rectangular structure having opposing first and second ends 306*a* and 306*b*. The body 304 also provides or defines a bottom 308 and an angled upper surface 310 opposite the bottom 306, and each of the bottom 308 and the angled upper surface 310 extend between the first and second ends 306*a,b*. In some embodiments, the bottom 308 may provide and otherwise define a planar or flat surface configured to be received against a corresponding planar bottom surface of the accumulation chamber 128 (FIG. 3B). In contrast, the angled upper surface 308 may be angled relative to the bottom 306 from a first or "upper" edge 312*a* to a second or "lower" edge 312*b*. Because of the angled nature of the upper surface 310, water impinging on the angled upper surface 310 will have the natural tendency to flow in the downward direction, and otherwise from the upper edge 312*a* toward the lower edge 312*b*.

In some embodiments, as illustrated, the body 304 may optionally include opposing end walls 314 provided at each end 306*a,b*. The upper surface of each end wall 314 may extend parallel to the bottom 308. Consequently, the end walls 314 may progressively increase in size in the direction from the upper edge 312*a* toward the lower edge 312*b*. In some embodiments, the end walls 314 may help maintain water flowing down the angled upper surface 310 instead of flowing laterally past the ends 306*a,b* of the body 304.

Referring again to FIG. 3B, the internal ramp 300 is shown arranged within the accumulation chamber 128. As indicated above, the internal ramp 300 may comprise an integral part of the sill 100 co-extruded with the sill 100 and within the accumulation chamber 128, but can alternatively comprise a separate component part designed to be received within the accumulation chamber 128, without departing from the scope of the disclosure.

As illustrated, the internal ramp 300 is arranged or otherwise oriented such that the angled upper surface 310 is directed toward the discharge port 130. More specifically, the internal ramp 300 is arranged such that the lower edge 312*b* is arranged closer to the discharge port 130, as compared to the upper edge 312*a*. As a result, water 124 entering the accumulation chamber 128 via the drain port(s) 126 will impinge upon the angled upper surface 310 and immediately start flowing towards the discharge port 130 based on the potential energy imparted to the water 124 by the angled upper surface 310. The downwardly angled upper surface 310 increases the potential speed or flow rate of the water 124 being evacuated from the sill 100, thus allowing the water 124 to evacuate at a quicker pace. Moreover, as the water 124 flows toward the discharge port 130, and because water is generally cohesive, the kinetic energy of the flowing water 124 may also have a tendency to draw cohesively connected water 124 toward the discharge port 130.

The angled upper surface 310 may exhibit an angle 316 relative to the bottom 308 of the internal ramp 300, or otherwise relative to the bottom surface of the accumulation chamber 128. The angle 316 may range between about 1° and about 15°. In some embodiments, the angle 316 may be about 8°, but could be more or less than 8°, depending on the application. In some embodiments, the angle 316 may be constant between the upper and lower edges 312*a,b* of the angled upper surface 310. In such embodiments, the angled upper surface 310 may comprise a constant planar surface extending between the upper and lower edges 312*a,b*. In other embodiments, however, the angle 316 may vary between the upper and lower edges 312*a,b*. In such embodiments, the angled upper surface 310 may comprise a discontinuous surface having varying degrees of elevation between the upper and lower edges 312*a,b*, and based on the variation of the angle 316.

While the water evacuation system 302 depicts a single internal ramp 300, it is contemplated herein to incorporate a plurality of internal ramps. In such embodiments, multiple internal ramps may be configured to further increase the velocity of the water being evacuated from the sill 100. In some applications, it is contemplated herein to have multiple, stacked internal ramps that feed each other in opposite directions, thus extending the flow path between the drain ports 126 to the discharge ports 130.

Figure 3C:
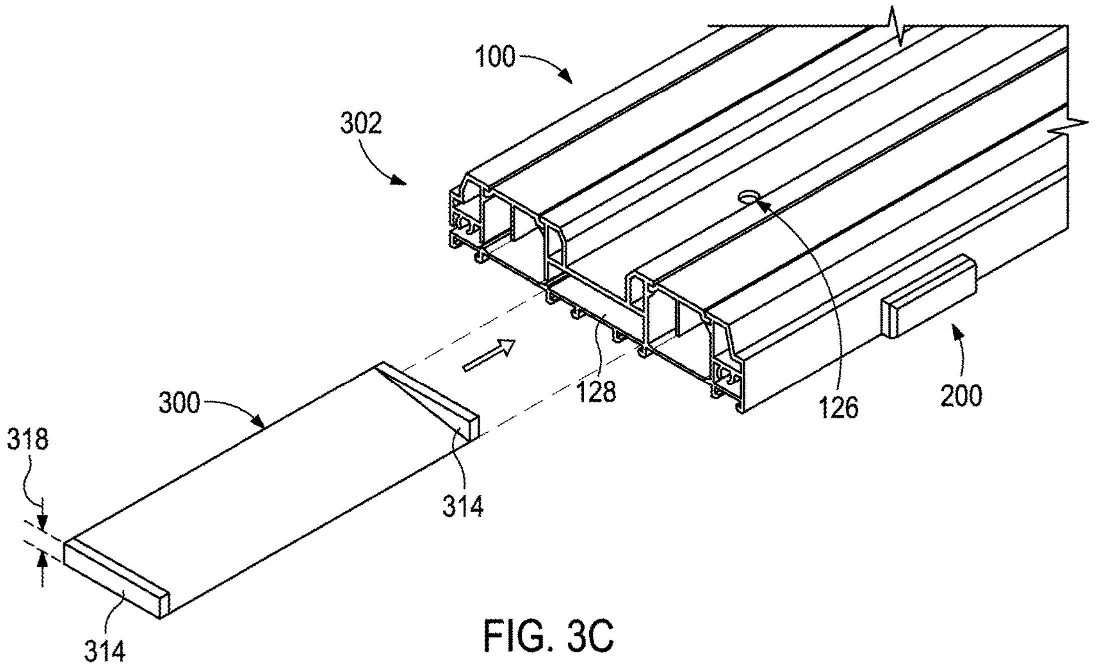
FIG. 3C is an isometric, schematic view of example assembly of the water evacuation system of FIG. 3B, according to one or more embodiments.

FIG. 3C is an isometric, schematic view of example assembly of the water evacuation system 302 of FIG. 3B, according to one or more embodiments. As illustrated, the internal ramp 300 may be advanced laterally into the accumulation chamber 128 until being arranged directly below a corresponding one of the drain ports 126. In one or more embodiments, the water evacuation system 302 may include a plurality of internal ramps 300 extended into the accumulation chamber 128 in series and arranged side-by-side.

In at least one embodiment, a height of one or both of the end walls 314 may be sized so as to provide an interference fit with the upper and lower surfaces of the accumulation chamber 128 when installed therein. In other embodiments, however, the internal ramp 300 may be secured within the accumulation chamber 128 by other means including, but not limited to, welding, brazing, a snap fit engagement, a mechanical attachment, one or more mechanical fasteners, an adhesive, a magnetic attachment, or any combination thereof.

FIG. 3C also depicts inclusion of the discharge port cover 200, as described with reference to FIGS. 2A-2B. Accordingly, in at least one embodiment, the water evacuation system 302 may include the discharge port cover 200, which may enhance the ability of the water evacuation system 302 to evacuate or drain water from the sill 100.

Figure 4:
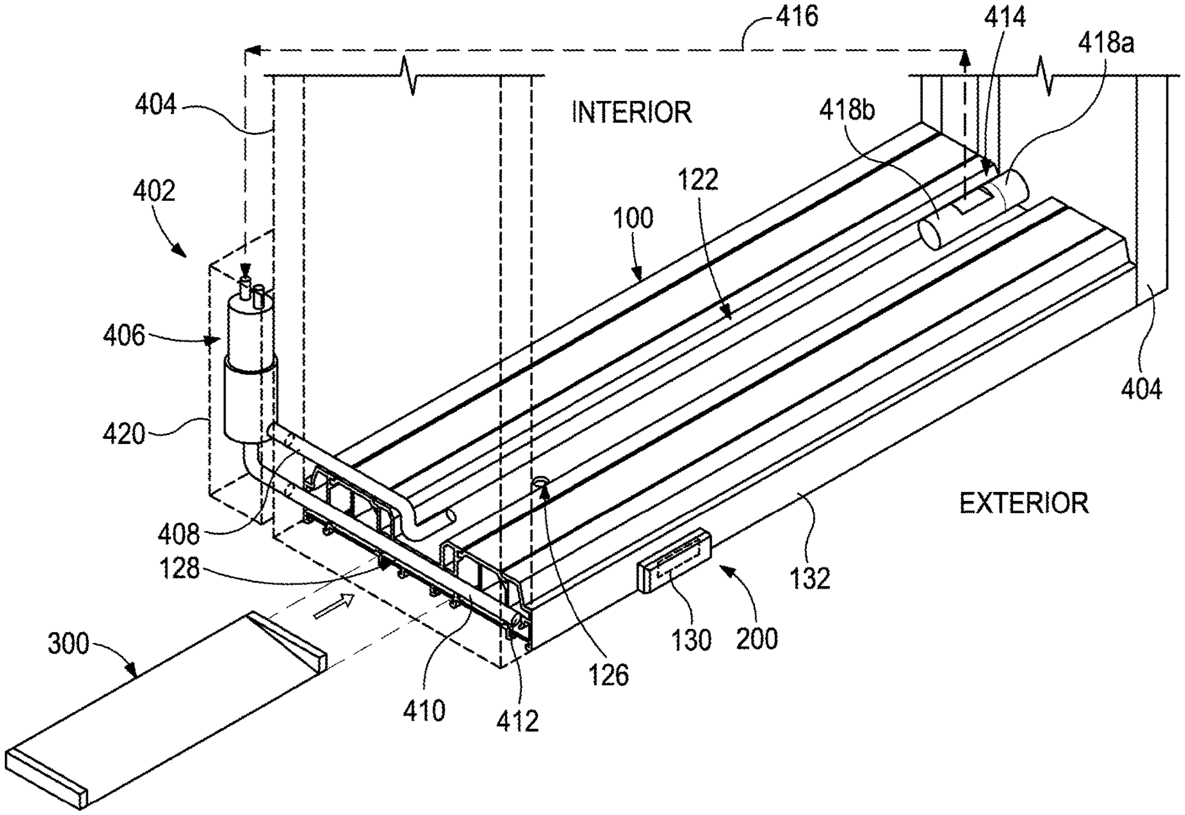
FIG. 4 is a schematic, isometric view of another example water evacuation system, according to one or more additional embodiments of the present disclosure.

FIG. 4 is a schematic, isometric view of another example water evacuation system 402, according to one or more additional embodiments of the present disclosure. As illustrated, the water evacuation system 402 includes the sill 100, which includes the dam 122, the accumulation chamber 128, and the discharge port(s) 130 (shown in dashed lines) defined in the front face 132 of the sill 100. The discharge port(s) 130 are in fluid communication with the dam 122 via the drain port(s) 126 and the accumulation chamber 128. In the illustrated embodiment, the water evacuation system 402 includes the discharge port cover 200, which is mounted to a corresponding discharge port 130 to enhance the ability of the water evacuation system 402 to evacuate and drain water from the sill 100.

In the illustrated embodiment, the sill 100 may be operatively coupled to opposing first and second frame members 404 that extend vertically from opposing lateral ends of the sill 100. The water evacuation system 402 may further include a pump 406 in fluid communication with the sill 100 via an inlet conduit 408 that extends between the pump 406 and the sill 100. The inlet conduit 408 may extend to a location on the sill 100 where the accumulation of water 124 (FIG. 1) may occur. In some embodiments, for example, the inlet conduit 408 may extend into the dam 122, but could alternatively extend into the accumulation chamber 128. When the pump 406 is operating (pumping), water 124 accumulating in the sill 100 (either within the dam 122 or the accumulation chamber 128) may be drawn into the inlet conduit 408, which actively evacuates the water 124 from the sill 100.

As illustrated, the water evacuation system 402 may further include a discharge conduit 410 extending from the pump 406 to an outlet orifice 412. Water 124 that is drawn from the sill 100 by operating the pump 406 may then be discharged (pumped) to the exterior of the building by flowing through the discharge conduit 410 and exiting the outlet orifice 412.

In some embodiments, as illustrated, the inlet and discharge conduit 408, 410 may extend at least partially through one of the frame members 404 (shown in phantom). In such embodiments, the outlet orifice 412 may be defined in a front (exterior) face of the corresponding frame member 404. In other embodiments, however, one or both of the inlet and discharge conduits 408, 410 may be configured to extend solely within the interior of the sill 100. In such embodiments, the outlet orifice 412 may be defined on the front face 132 sill 100.

In some embodiments, the water evacuation system 402 may further include a float switch 414. The float switch 414 may be communicably coupled to the pump 406 via a communication line 416. In some embodiments, the communication line 416 may comprise a wired interface, such as an electrical or fiber optic line. In other embodiments, however the communication line 416 may comprise any wired or wireless interface that allows the float switch 414 to communicate a signal to the pump 406.

The float switch 414 may be secured to the sill 100 in a location where the water 124 (FIG. 1) tends to accumulate. In some embodiments, for example, the float switch 414 may be arranged within the dam 122. In other embodiments, however, the float switch 414 may be arranged within the accumulation chamber 128.

The float switch 414 may include a static portion 418*a* that is secured to the sill 100, and a floating portion 418*b* pivotably coupled to the static portion 418*a*. The floating portion 418*b* may be buoyant in water and thereby able to pivot relative to the static portion 418*a* as the level of the water 124 (FIG. 1) accumulating in the sill 100 (either within the dam 122 or the accumulation chamber 128) increases and acts on the floating portion 418*b*. Once the accumulating water 124 reaches a predetermined level or limit, the floating portion 418*b* will pivot and engage a contact point provided on the static portion 418*a*, which triggers communication of a signal to the pump 406. Upon receiving the signal, the pump 406 may be activated to commence actively drawing (pumping) water 124 from the dam 122 or the accumulation chamber 128 via the inlet conduit 408, depending on where the inlet conduit 408 extends to. The water 124 drawn from the sill 100 may then be discharged to the exterior the building via the discharge conduit 410 and the outlet orifice 412.

The pump 406 may be arranged within one of the frame members 404, but could alternatively be arranged within a dedicated housing 420 mountable to or within the frame member 404. In other embodiments, the pump 406 may be arranged within a dedicated chamber or pocket defined within the sill 100, without departing from the scope of the disclosure. The pump 406 may be a submersible or non-submersible pump. In some embodiments, the pump 406 may be equipped with one or more batteries configured to power operation of the pump 406, such as a 12 V or 24 V power source. In other embodiments, the pump 406 may be wired to the local power of the building, without departing from the scope of the disclosure.

FIG. 4 also depicts inclusion of the discharge port cover 200 and the internal ramp 300, as described with reference to FIGS. 2A-2B and 3A-3B. Accordingly, in at least one embodiment, the water evacuation system 402 may include the discharge port cover 200 and the internal ramp 300, which may enhance the ability of the water evacuation system 402 to evacuate or drain water from the sill 100.

Figure 5A:
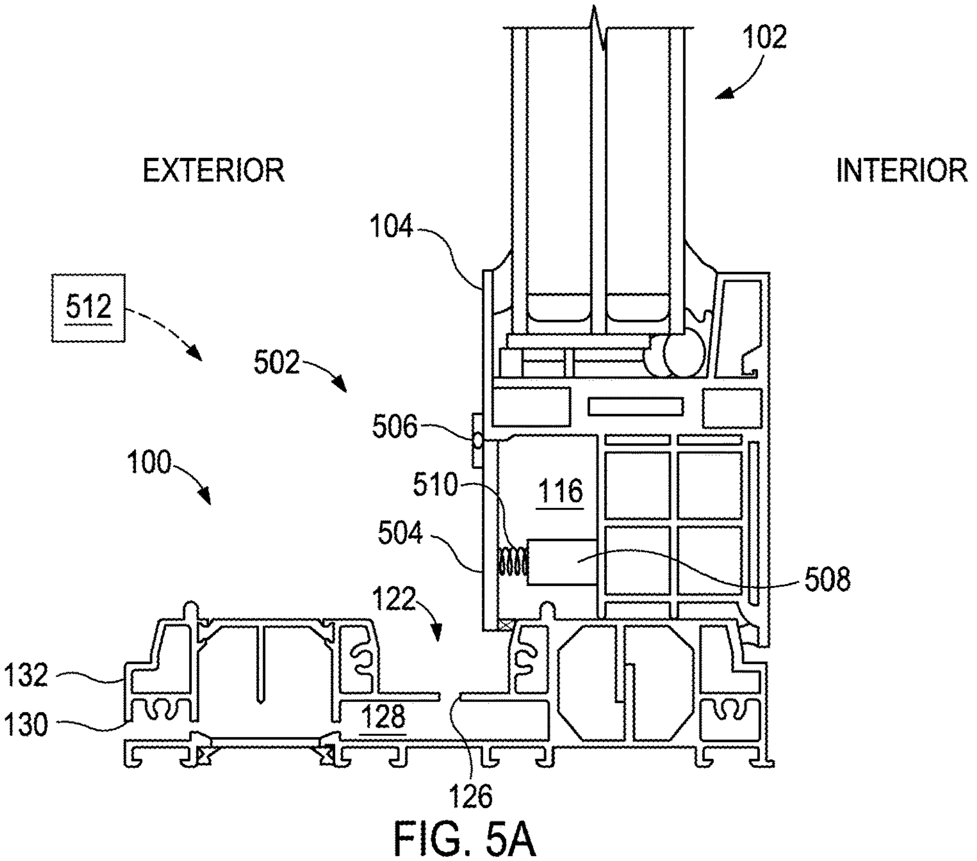
FIGS. 5A and 5B are a schematic, side views of another example water evacuation system, according to one or more additional embodiments of the present disclosure.
Figure 5B:
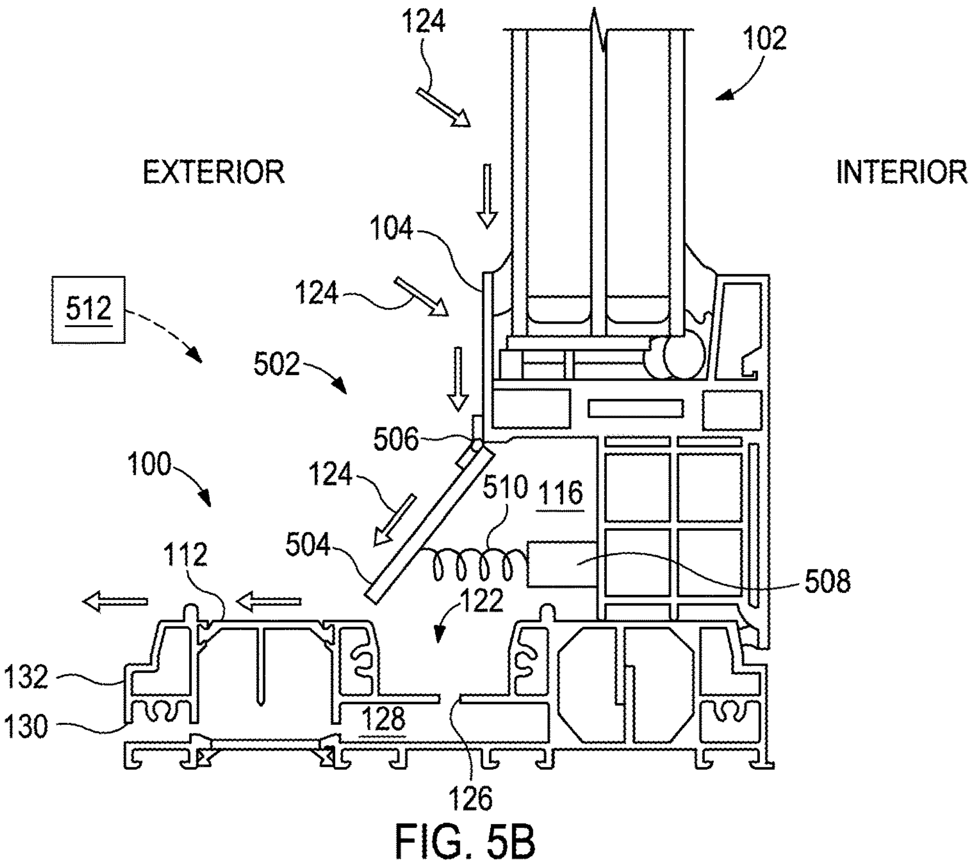

FIGS. 5A and 5B are schematic, side views of another example water evacuation system 502, according to one or more additional embodiments of the present disclosure. As illustrated, the water evacuation system 502 includes the sill 100, which includes the dam 122, the accumulation chamber 128, and the discharge port(s) 130 (shown in dashed lines) defined in the front face 132 of the sill 100 and in fluid communication with the dam 122 via the drain port(s) 126 and the accumulation chamber 128.

The water evacuation system 502 further includes a movable shield 504. In some embodiments, the movable shield 504 may have a length equal to the length of the sliding door assembly 102 and/or the sill 100. The movable shield 504 is actuatable between a first or "stowed" configuration, as shown in FIG. 5A, and a second or "deployed" configuration, as shown in FIG. 5B. As illustrated, the movable shield 504 may be pivotably coupled to the sill receptor 104 at a hinge 506. In some embodiments, the hinge 506 may comprise a living hinge, but could alternately comprise a spring-loaded hinge, such as a hinge that includes a torsion spring that naturally biases the movable shield 504 to the stowed configuration.

The water evacuation system 502 may further include an actuator 508 operable to move the movable shield 504 between the stowed and deployed configurations. In some embodiments, as illustrated, the actuator 508 may be arranged within the cavity 116 defined within the lower portion of the sill receptor 104, but could alternatively be arranged at other locations capable of engaging the backside of the movable shield 504. With the movable shield 504 in the deployed configuration, as shown in FIG. 5B, water 124 in the form of precipitation may impact and flow down the exterior surfaces of the sliding door assembly 102 until eventually reaching the movable shield 504. Instead of flowing into the dam 122, the water 124 is diverted by the deployed movable shield 504 onto the exterior portion 112 and off the sill 100 to the exterior of the building.

In some embodiments, the actuator 508 may include a biasing element 510 engageable with the backside of the movable shield 504. Upon activation of the actuator 508, the biasing element 510 may be deployed and otherwise able to transition the movable shield 504 to the deployed configuration. In some embodiments, the biasing element 510 may comprise a coil spring. In other embodiments, however, the biasing element 510 may comprise a hydraulic cylinder system attached to the backside of the movable shield 504 and actuatable to pivot the movable shield 504 to the deployed configuration. In yet further embodiments, the biasing element may comprise a mechanical linkage extending between the movable shield 504 and a portion of the sliding door assembly 102. In such embodiments, closing the sliding door assembly 102 causes the mechanical linkage to automatically act on the movable shield 504 and thereby transition the movable shield 504 to the deployed configuration.

In some embodiments, the movable shield 504 may be automatically transitioned from the stowed configuration to the deployed configuration upon moving the sliding door assembly 102 to its closed position. As will be appreciated by those skilled in the art, there are numerous ways to accomplish this. In some embodiments, for example, the water evacuation system 502 may further include a sensor or similar contact location that is activated (triggered) upon closing the sliding door assembly 102. In such embodiments, once the sliding door assembly 102 is closed, the sensor may send a signal to the actuator 508 to transition the movable shield 504 to the deployed configuration. In other embodiments, the float switch 414 (FIG. 4) may be able to communicate with the actuator 508. In such embodiments, once the accumulating water 124 reaches a predetermined level or limit a signal may be sent to the actuator 508 to transition the movable shield 504 to the deployed configuration. In yet other embodiments, the water evacuation system 502 may further include one or more sensors 512 in communication with the actuator 508 and configured to sense the water 124 in the form of precipitation. Upon sensing the precipitation, the sensors 512 may send a signal to the actuator 508 to transition the movable shield 504 to the deployed configuration.

The disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is:

1. A water evacuation system, comprising:

a sill providing:

a dam that defines one or more drain ports;

an accumulation chamber defined within an interior of the sill and in fluid communication with the dam via the one or more drain ports, the interior providing an upper interior surface through which the one or more drain ports are defined and a lower interior surface opposite the upper interior surface; and one or more discharge ports defined in a front face of the sill and in fluid communication with the accumulation chamber; and an internal ramp comprising a structure separate from the sill and arrangeable within the accumulation chamber between the upper and lower interior surfaces and below the one or more drain ports, the internal ramp contacting the lower interior surface of the accumulation chamber and including an angled upper surface directed toward the one or more discharge ports, the angled upper surface extending at an angle from an upper edge of the angled upper surface toward a lower edge of the angled upper surface, where the upper edge is closer to the upper interior surface than the lower edge, wherein water entering the accumulation chamber via the one or more drain ports will contact the angled upper surface and flow towards the one or more discharge ports to be evacuated from the sill.

2. The water evacuation system of claim 1, wherein the internal ramp further comprises:

an elongate body having opposing first and second ends; and a bottom arranged opposite the angled upper surface and contacting the lower interior surface, each of the bottom and the angled upper surface extending between the first and second ends, wherein the lower edge of the angled surface is arranged closer to the one or more discharge ports when the internal ramp is arranged within the accumulation chamber.

3. The water evacuation system of claim 1, further comprising:

a pump in fluid communication with the sill via an inlet conduit to draw water from the sill into the inlet conduit;

a discharge conduit extending from the pump to an outlet orifice to convey the water from the pump to the outlet orifice to be discharged to an exterior of a building; and a float switch mounted to the sill and in communication with the pump, wherein, when the water accumulating in the sill reaches a predetermined level and acts on the float switch, the float switch sends a signal to the pump to commence pumping the water out of the sill.

4. The water evacuation system of claim 3, wherein the float switch is arranged within one of the dam and the accumulation chamber, and the inlet conduit extends between the pump and the one of the dam and the accumulation chamber.

5. The water evacuation system of claim 1, further comprising a discharge port cover secured to the sill at a corresponding one of the one or more discharge ports, the discharge port cover including a body that includes:

a front plate;

a top extending laterally from and perpendicular to the front plate; and one or more coupling members receivable within the corresponding one of the one or more discharge ports to secure the discharge port cover to the corresponding one of the one or more discharge ports, wherein, when the discharge port cover is received within the corresponding one of the one or more discharge ports, a downspout is cooperatively defined between the discharge port cover and the front face of the sill.

6. The water evacuation system of claim 1, further comprising a movable shield actuatable between a stowed configuration and a deployed configuration, wherein, when the movable shield is transitioned to the deployed configuration, the movable shield diverts water away from the dam.

7. The water evacuation system of claim 1, wherein the sill provides a mounting portion and a sliding door assembly is configured to be mounted to the sill at the mounting portion, the sliding door assembly including:

a sill receptor that defines a cavity sized to receive the mounting portion; and one or more panels mounted to the sill receptor and extending vertically therefrom.

8. A water evacuation system, comprising:

a sill providing:

a dam that defines one or more drain ports;

an accumulation chamber arranged vertically below the dam and defined within an interior of the sill and in fluid communication with the dam via the one or more drain ports, the interior providing an upper interior surface through which the one or more drain ports are defined and a lower interior surface opposite the upper interior surface; and one or more discharge ports defined in a front face of the sill and in fluid communication with the accumulation chamber;

an internal ramp comprising a structure separate from the sill and arrangeable within the accumulation chamber between the upper and lower interior surfaces and below the one or more drain ports, the internal ramp contacting the lower interior surface of the accumulation chamber and including an angled upper surface directed toward the one or more discharge ports, the angled upper surface extending at an angle from an upper edge of the angled upper surface toward a lower edge of the angled upper surface, where the upper edge is closer to the upper interior surface than the lower edge;

a pump in fluid communication with the sill via an inlet conduit that extends from the pump and terminates in the dam; and a discharge conduit extending from the pump to an outlet orifice to convey water from the pump to the outlet orifice to be discharged to an exterior of a building.

9. The water evacuation system of claim 8, further comprising a float switch mounted to the sill and communicably coupled to the pump, the float switch including:

a static portion secured to the sill; and a floating portion pivotably coupled to the static portion and buoyant in water, wherein, when water accumulating in the sill reaches a predetermined level, the floating portion floats on the water and sends a signal to the pump to commence operation.

10. The water evacuation system of claim 9, wherein the float switch is arranged within one of the dam and the accumulation chamber.

11. The water evacuation system of claim 9, wherein one or both of the inlet and discharge conduits extend at least partially through a frame member extending vertically from the sill.

12. The water evacuation system of claim 8, wherein the internal ramp further comprises:

an elongate body having opposing first and second ends; and a bottom arranged opposite the angled upper surface and contacting the lower interior surface, each of the bottom and the angled upper surface extending between the first and second ends, wherein the lower edge is arranged closer to the one or more discharge ports.

13. The water evacuation system of claim 8, further comprising a discharge port cover secured to the sill at a corresponding one of the one or more discharge ports, the discharge port cover including a body that includes:

a front plate;

a top extending laterally from and perpendicular to the front plate; and one or more coupling members receivable within the corresponding one of the one or more discharge ports to secure the discharge port cover to the corresponding one of the one or more discharge ports, wherein, when the discharge port cover is received within the corresponding one of the one or more discharge ports, a downspout is cooperatively defined between the discharge port cover and the front face of the sill.

14. The water evacuation system of claim 8, further comprising a movable shield actuatable between a stowed configuration and a deployed configuration, wherein, when the movable shield is transitioned to the deployed configuration, the movable shield diverts water away from the dam.

15. A method, comprising:

receiving water into a dam of a sill;

draining the water from the dam into an accumulation chamber via one or more drain ports defined in the dam, the accumulation chamber defined within an interior of the sill below the dam, the interior providing an upper interior surface through which the one or more drain ports are defined and a lower interior surface opposite the upper interior surface;

receiving the water draining into the accumulation chamber on an internal ramp arranged within the accumulation chamber between the upper and lower interior surfaces, the internal ramp comprising a structure separate from the sill and contacting the lower interior surface, and the internal ramp including an angled upper surface facing toward one or more discharge ports defined in a front face of the sill and in fluid communication with the accumulation chamber, the angled upper surface extending at an angle from an upper edge of the angled upper surface toward a lower edge of the angled upper surface, where the upper edge is closer to the upper interior surface than the lower edge; and flowing the water from the internal ramp towards the one or more discharge ports to be evacuated from the sill.

16. A method, comprising:

receiving water into a dam of a sill;

draining at least a portion of the water from the dam into an accumulation chamber via one or more drain ports defined in the dam, the accumulation chamber being defined within an interior of the sill and vertically below the dam, the interior providing an upper interior surface through which the one or more drain ports are defined and a lower interior surface opposite the upper interior surface;

engaging the water draining into the accumulation chamber with an internal ramp arranged within the accumulation chamber and between the upper and lower interior surfaces, the internal ramp comprising a structure separate from the sill and contacting the lower interior surface of the accumulation chamber, the internal ramp further including an angled upper surface directed toward one or more discharge ports formed in the sill, the angled upper surface extending at an angle from an upper edge of the angled upper surface toward a lower edge of the angled upper surface, where the upper edge is closer to the upper interior surface than the lower edge, and wherein the sill has a float switch mounted thereto and arranged within one of the dam and the accumulation chamber, the float switch including:

a static portion secured to the sill; and a floating portion pivotably coupled to the static portion and buoyant in the water;

accumulating the water within the one of the dam and the accumulation chamber and thereby causing the floating portion to float on the water;

sending a signal to a pump in communication with the float switch when the water accumulating in the one of the dam and the accumulation chamber reaches a predetermined level, wherein the pump is in fluid communication with the sill via an inlet conduit that extends from the pump and terminates in the dam;

drawing the water out of the dam with the pump upon receiving the signal; and pumping the water to an outlet orifice to be discharged to an exterior of a building via a discharge conduit extending from the pump to the outlet orifice.

17. The water evacuation system of claim 9, wherein the float switch is arranged within the dam.

18. The method of claim 16, wherein the float switch is arranged within the dam.

19. The water evacuation system of claim 1, wherein the accumulation chamber is a first accumulation chamber and the sill further comprises a second accumulation chamber in fluid communication with the first accumulation chamber and disposed between the one or more discharge ports and the first accumulation chamber, and wherein water flows through the second accumulation chamber towards the one or more discharge ports to be evacuated from the sill.

20. The water evacuation system of claim 1, wherein the internal ramp further comprises:

an elongate body having opposing first and second ends and a bottom surface opposite of the angled upper surface contacting the lower interior surface, the first and second ends defining opposing end walls, and wherein the angled upper surface extends between the opposing end walls, and the opposing end walls progressively increase in size in a direction from the upper edge of the angled surface to the lower edge of the angled surface.

21. The water evacuation system of claim 1, wherein the angle is constant between the upper and lower edges.

* * * * *